United States Patent [19]
Irie

[11] Patent Number: 5,991,016
[45] Date of Patent: Nov. 23, 1999

[54] APPARATUS FOR PRODUCING VARIABLE LEVELS OF UNIFORM LIGHT FLUX

[75] Inventor: Noriyuki Irie, Tokyo, Japan

[73] Assignee: Nikon Corporation, Tokyo, Japan

[21] Appl. No.: 08/758,470

[22] Filed: Dec. 4, 1996

[30] Foreign Application Priority Data

Dec. 4, 1995 [JP] Japan .................................. 7-315474

[51] Int. Cl.⁶ .................................................. G01J 1/40
[52] U.S. Cl. .......................... 356/233; 372/101; 355/67; 356/229
[58] Field of Search ........................... 372/101; 359/679, 359/738–740, 690; 356/229, 233; 219/121.61, 121.73, 121.75; 355/67

[56] References Cited

U.S. PATENT DOCUMENTS

| | | |
|---|---|---|
| 4,466,708 | 8/1984 | Betensky .................................. 359/690 |
| 4,559,546 | 12/1985 | Yip .......................................... 359/281 |
| 5,042,048 | 8/1991 | Meyer ...................................... 372/107 |
| 5,093,838 | 3/1992 | Kubota ..................................... 372/101 |
| 5,168,402 | 12/1992 | Mihara ..................................... 359/687 |
| 5,214,485 | 5/1993 | Sasnett et al. ......................... 356/121 |
| 5,221,995 | 6/1993 | Yaneyama ................................ 359/688 |
| 5,245,384 | 9/1993 | Mori ........................................ 355/67 |
| 5,461,212 | 10/1995 | Seiler et al. ........................ 219/121.68 |
| 5,465,178 | 11/1995 | Nakai et al. ............................ 372/101 |
| 5,636,003 | 6/1997 | Tanitsu et al. .......................... 359/618 |

Primary Examiner—Robert H. Kim
Assistant Examiner—Zandra V. Smith
Attorney, Agent, or Firm—Klarquist Sparkman Campbell Leigh & Whinston, LLP

[57] ABSTRACT

Apparatus are disclosed that are operable to changes the intensity, per unit surface area, of an irradiation laser light flux. A typical apparatus comprises, on an optical axis, an irradiation laser light source, a stop defining an aperture, and an optical subsystem situated between the light source and the stop. The optical subsystem is operable to change the intensity of the irradiation laser light flux passing through the aperture by changing the diameter of the beam of irradiation laser light flux incident on the stop.

20 Claims, 4 Drawing Sheets

APPARATUS FOR PRODUCING VARIABLE LEVELS OF UNIFORM LIGHT FLUX

FIELD OF THE INVENTION

This invention pertains to apparatus operable to produce a variable but substantially uniform irradiation light-flux density (intensity per unit area impinged by the light) from a light source producing a substantially constant light intensity. The invention also pertains to optical test equipment, comprising such apparatus, usable for investigating the resistance of various materials to repeated exposure to high-intensity light.

BACKGROUND OF THE INVENTION

Certain optical systems operable to change the intensity of light applied to a unit surface area are known. A representative system is depicted schematically in FIG. 4, comprising (on an optical axis A) a light source 111, a convex lens 112, and a stop 113 defining an aperture 113a. Light flux is directed onto the surface of a specimen 118. The light flux emitted by the light source 111 is focused by the lens 112 at a focal point FP located between the stop 113 and the specimen 118; downstream of the focal point FP, the light flux diverges. With the FIG. 4 apparatus, the intensity of light per unit surface area of the specimen can be changed by moving the specimen 118 along the optical axis A (i.e., moving the specimen left or right as indicated by the arrows beneath the specimen).

Optical systems such as that in FIG. 4 are conventionally used, e.g., in testing schemes for ascertaining the durability of various materials when exposed to laser light. Such tests are increasingly indicated as lasers become increasingly more powerful. The tests are typically performed by irradiating the specimen with a laser while critically observing and evaluating any damage caused by the exposure. Usual tested specimens include optical components such as lenses and mirrors, as well as coatings applied to such optical components for, e.g., antireflective purposes.

In an apparatus as shown in FIG. 4, as light intensity per unit surface area is changed, the irradiation surface area of the laser light also changes. In other words, one cannot change the intensity of light per unit surface area of the specimen without also changing the surface area of the specimen that is irradiated by the laser light. Consequently, this kind of optical system cannot be used if one wishes to limit or otherwise control the size of the irradiation field on the specimen surface.

Another testing apparatus as known in the art is schematically depicted in FIG. 5. A high-power laser light source 211 produces light that passes through a condensing optical subsystem 220 onto the surface of a specimen 218. A beam splitter 215, situated between the condensing optical subsystem 220 and the specimen 218, reflects some of the laser light toward a power monitor 217. The power monitor 217 measures the intensity of laser light at the specimen surface based on the reflected light. An extinction filter 219 is situated between the laser light source 211 and the condensing optical subsystem 220. The intensity of laser light at the specimen surface can be changed by changing the extinction filter 219 as appropriate for the particular specimen.

Apparatus as shown in FIG. 5 also have substantial shortcomings. First, having to change the extinction filter 219 to change light intensity is extremely troublesome. Second, if the light source 211 is an excimer laser or other laser that emits a very high-energy laser light, extinction filters capable of withstanding such intense light are rare or do not exist. Third, changing light intensity by changing the extinction filter means that the intensity of the light per unit surface area can be changed only step-wise. This makes it impossible to randomly set the value of the light intensity, i.e., to change the light intensity continuously over a range.

SUMMARY OF THE INVENTION

In view of the shortcomings of the prior art as summarized above, an object of the present invention is to provide a simple-to-use apparatus operable to produce variable levels of light intensity per unit surface area of a specimen, while avoiding problems encountered with prior-art apparatus.

In general, an apparatus according to the invention comprises, as arranged on an optical axis, an irradiation laser light source operable to produce an irradiation laser light flux, an intensity-adjusting optical subsystem operable to change the intensity per unit area of the irradiation laser light flux, and a stop defining an aperture. The irradiation laser light flux generated by the irradiation laser light source propagates through the intensity-adjusting optical subsystem toward the aperture (the stop is situated so that the aperture is situated within the irradiation field of the light flux). Of the light passing through the aperture, the light intensity per unit area on a transverse plane defined by the stop is changed by changing the beam diameter of the irradiation light field. This is accomplished by a manipulation of the intensity-adjusting optical subsystem.

According to another aspect of the present invention, the apparatus can further comprise a condensing optical subsystem operable to focus the light flux, after having passed through the aperture, on a specimen.

According to yet another aspect of the present invention, the stop is preferably operable to allow the diameter of the aperture to be changed.

According to yet another aspect of the present invention, the irradiation laser light source can be an excimer laser.

According to yet another aspect of the present invention, the intensity-adjusting optical subsystem preferably comprises at least three lens groups. The diameter of the irradiation laser light flux is changed by moving at least one of the lens groups along the optical axis.

The foregoing and additional features and advantages of the present invention will be more readily apparent from the following detailed description, which proceeds with reference to the accompanying drawings.

DETAILED DESCRIPTION

Figure 1A:
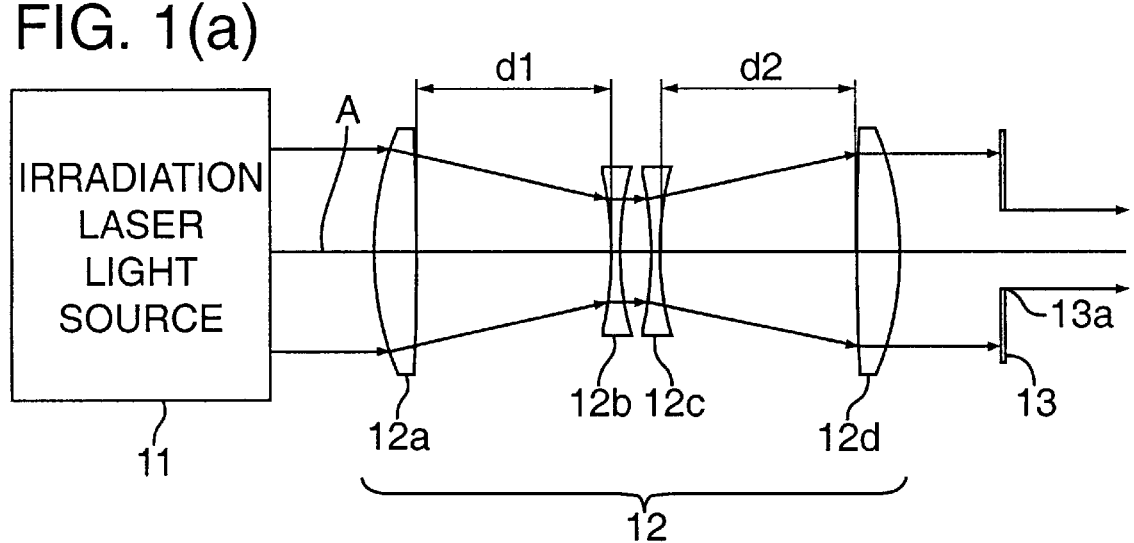
FIG. 1(a) is a schematic optical diagram showing features of a preferred embodiment of an apparatus according to the invention, wherein the intensity-adjusting optical subsystem is adjusted to produce a wide (less intense) irradiation laser light flux passing through the aperture.
Figure 1B:
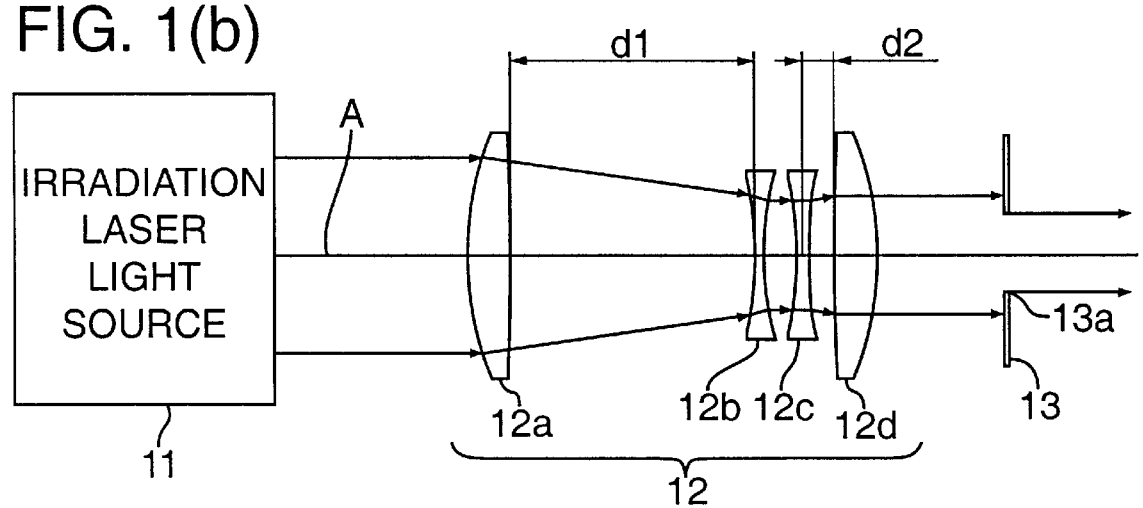
FIG. 1(b) is a schematic optical diagram of the FIG. 1(a) embodiment wherein the intensity-adjusting optical subsystem is adjusted to produce a relatively narrow (more intense) irradiation laser light flux passing through the aperture.

FIG. 1(a) and FIG. 1(b) depict features of a preferred embodiment of an apparatus according to the present invention. The apparatus, as arranged on an optical axis, comprises an irradiation laser light source 11, an intensity-adjusting optical subsystem 12 operable to change the intensity per unit area of the irradiation laser light flux, and a stop 13 defining an aperture 13a. The irradiation laser light flux produced by the irradiation laser light source 11 comprises substantially parallel rays. The aperture 13a is preferably round. The irradiation laser light flux propagates from the irradiation laser light source 11 through the intensity-adjusting optical subsystem 12 toward the aperture 13a. The stop 13 is situated so that the aperture 13a is situated within the beam diameter of the irradiation laser light flux. The irradiation laserlight flux propagating from the intensity-adjusting optical subsystem 12 to the stop 13 comprises substantially parallel rays. Thus, the aperture defines the beam diameter of irradiation laser light flux that would be incident on a specimen or other surface (not shown) situated downstream of the stop.

As used herein, "beam diameter" refers to any convenient measure of the width, transverse to the optical axis, of the irradiation laser light flux, and is not intended to signify that the irradiation laser light flux necessarily has a circular transverse profile.

It will also be understood that "light" as used herein is not limited to the visible portion of the electromagnetic spectrum, and that any optical subsystems or components described herein are not limited to such subsystems or components that pass visible light.

The intensity-adjusting optical subsystem 12 preferably comprises two convex lens elements 12a, 12d and two concave lens elements 12b, 12c. The convex lens element 12a and the concave lens elements 12b, 12c are operable to be moved as a unit along the optical axis A, as actuated by an operating member (not shown). The axial distance between the convex lens element 12a and the concave lens element 12b is dl; and the axial distance between the concave lens element 12c and the convex lens element 12d is d2. Whenever d1 and d2 are nearly equal, as shown in FIG. 1(a), the beam diameter of the irradiation laser light flux entering the convex lens element 12a will be substantially equal to the beam diameter of the irradiation laser light flux exiting the convex lens element 12d.

If, as shown in FIG. 1(b), d1 is greater than d2, the beam diameter of the irradiation laser light flux exiting the convex lens 12d is smaller than the beam diameter of the irradiation laser light flux entering the convex lens element 12a. In addition, although not specifically illustrated, it will be readily understood from the foregoing that, if d1 were less than d2, the beam diameter of the irradiation laser light flux exiting the convex lens 12d would be greater than the beam diameter of the irradiation laser light flux entering the convex lens element 12a.

Thus, the beam diameter of the irradiation laser light flux exiting the convex lens element 12d changes according to the values of dl and d2. Since the diameter of the aperture 13a typically remains unchanged as the beam diameter of the irradiation laser light flux upstream of the stop changes, the intensity of the irradiation laser light flux downstream of the aperture 13a is changed by changing di relative to d2 or vice versa.

Figure 2:
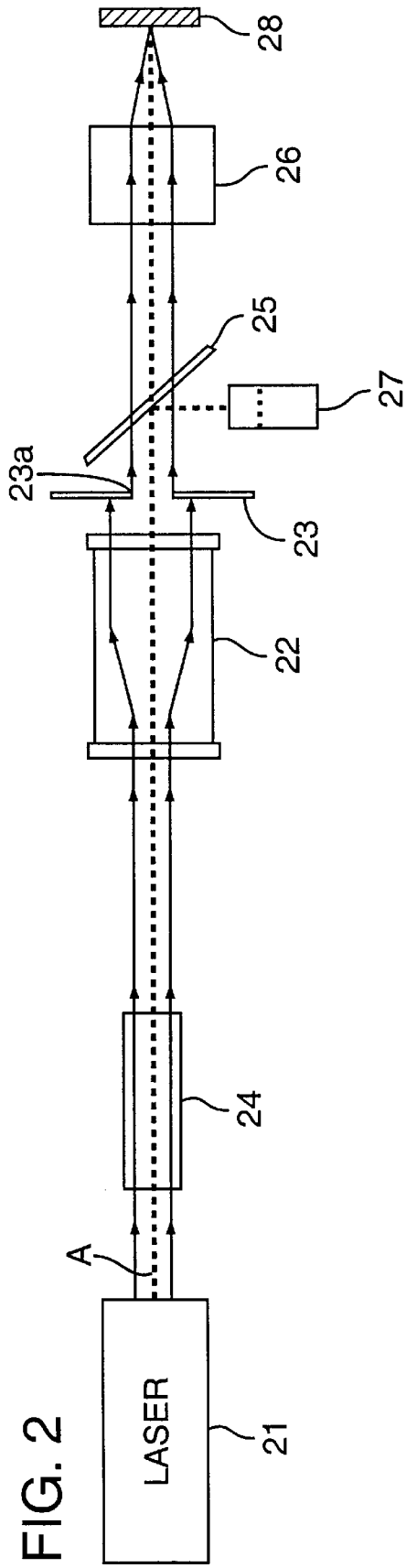
FIG. 2 is a schematic optical diagram of a preferred embodiment of an apparatus according to the invention as especially configured for evaluating the effects of laser light on a specimen.

A representative embodiment of an apparatus according to the present invention as used for evaluating laser damage to a specimen is schematically shown in FIG. 2. Such a laser-damage evaluation apparatus is useful for performing evaluation tests wherein a laser is irradiated on a specimen and the extent of damage to the specimen from exposure to the laser light is evaluated. Such an apparatus has especial utility in ascertaining the durability of a specimen to laser light.

The laser-damage evaluation apparatus of FIG. 2 comprises (as disposed on an optical axis A) a laser 21 producing an irradiation laser light flux of substantially parallel rays, an intensity-adjusting optical subsystem 22, and a stop 23 defining an aperture 23a. The apparatus further comprises a beam-shaping optical subsystem 24, a beam splitter 25, a condensing optical subsystem 26, and a power monitor 27. The laser 21 is preferably a KrF excimer laser that generates pulsed 248-nm ultraviolet light. The beam-shaping optical subsystem 24 comprises a lens element operable to shape the transverse profile of the laser light emitted from the laser 21.

In FIG. 2, the intensity-adjusting optical subsystem 22 preferably comprises four lens elements arranged in three groups, as described above. The lens elements are each movable to change the beam diameter of the laser light exiting the intensity-adjusting optical subsystem 22. The irradiation laser light flux entering the intensity-adjusting optical subsystem 22 are refracted by the intensity-adjusting optical subsystem such that the irradiation laser light flux exiting the intensity-adjusting optical subsystem comprises substantially parallel rays.

By way of example and not intended to be limiting, the aperture 23a is 11 mm in diameter. The stop 23 is preferably fabricated from a metallic material, preferably including an alumite or analogous coating to suppress reflection of laser light from the surface of the stop.

The stop 23 also preferably comprises an adjustment mechanism allowing the diameter of the aperture 23a to be adjusted. The stop 23 with adjustment mechanism can be, e.g., of the type employing multiple aperture-defining blades as used in photographic cameras and lenses. In such a case, the aperture 23a will not be defined as a perfect circle, but rather as a locus of multiple intersecting arcs (this departure from roundness of the aperture should be considered when performing precise measurements). The diameter of the aperture 23a also can be changed by simply exchanging stops each defining an aperture with a different diameter.

The beam splitter 25 extracts part of the laser light flux passing through the aperture 23a (for example, approximately four percent). The extracted light is directed to the power monitor 27. Preferably, the beam splitter 25 is manufactured of quartz with a surface reflectivity of approximately four percent. The power monitor 27 is operable to calculate the light intensity on the specimen surface based on the measured light intensity reflected from the beam splitter 25 to the power monitor 27.

The condensing optical subsystem 26 preferably comprises four lens elements (not shown) that are collectively operable to converge the laser light flux passing through the aperture 23a to a substantially smaller beam diameter. Using the foregoing example, the condensing optical subsystem 26 can reduce the 11-mm beam diameter of the light flux passing through the aperture to a 1-mm beam diameter on the surface of a specimen 28; such a reduction in beam diameter increases the energy density of irradiation light at the specimen surface by $11^2$. Advantageously, in this example, since the energy density of the irradiation laser light flux when the light flux enters the condensing optical subsystem 26 is $1/11^2$ the energy density at the specimen surface, the condensing optical subsystem 26 is not damaged by the laser light.

During use of an apparatus such as shown in FIG. 2, the specimen 28 is placed as shown, and the intensity-adjusting optical subsystem 22 is adjusted so that a desired intensity of laser light is incident on the specimen 28. Then, the laser 21 is operated to illuminate the specimen 28 for a set period of time. After completion of the exposure, the specimen 28 is examined using, for example, an optical microscope to ascertain the extent of any surficial or other damage caused by exposure to the laser light.

The process as described above is repeated for multiple specimens as desired. The intensity of the laser light can be individually adjusted for each new specimen using the intensity-adjusting optical subsystem 22. Typically, increasing the beam diameter of the light flux exiting the intensity-adjusting optical subsystem 22 causes a corresponding decrease in light intensity passing through the aperture 23a and thus in light intensity per unit area of surface of the specimen. Conversely, decreasing the beam diameter of the light flux exiting the intensity-adjusting optical subsystem 22 causes a corresponding increase in light intensity passing through the aperture 23a and thus in light intensity per unit area of surface of the specimen.

Figure 3:
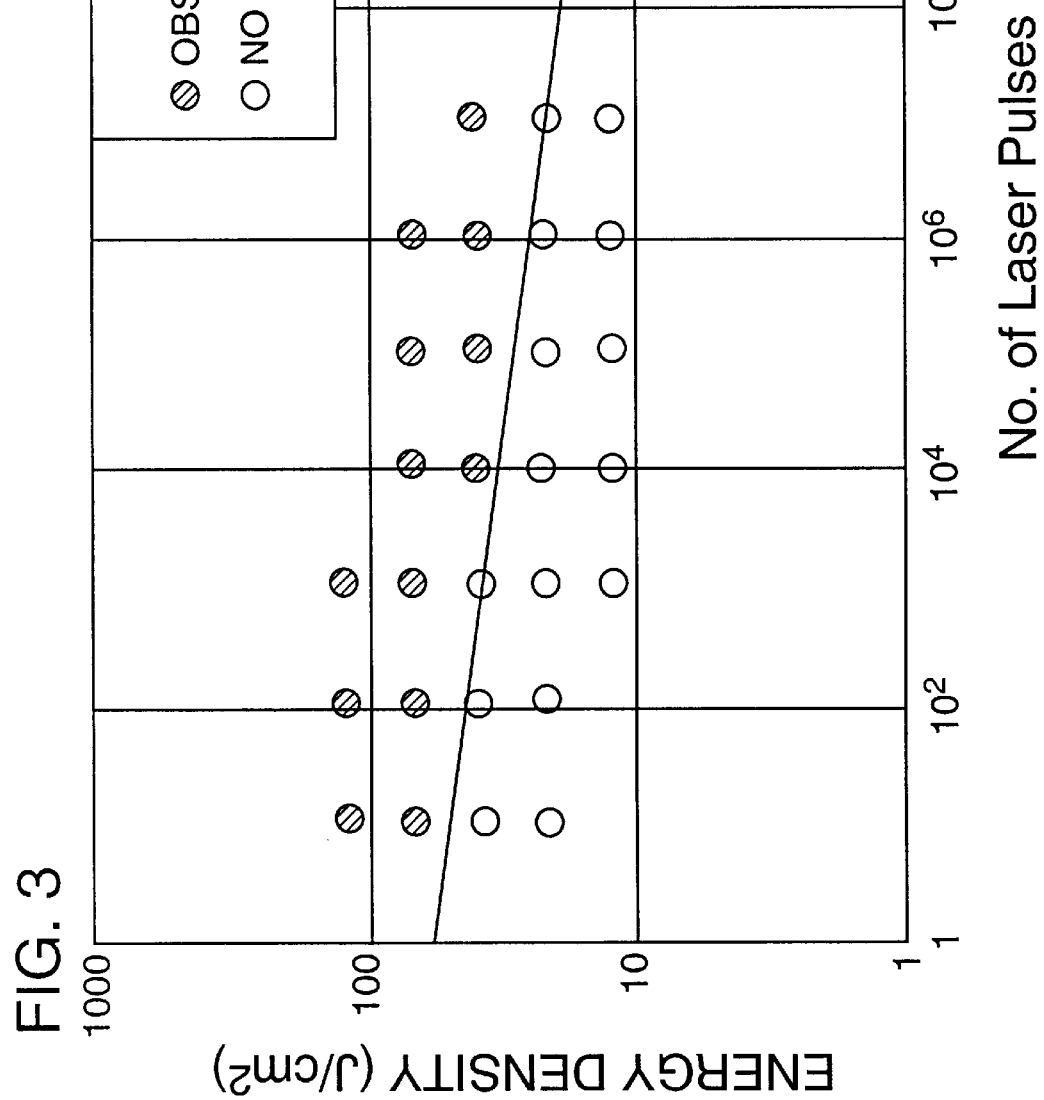
FIG. 3 is a graph of data obtained in an experiment in which an apparatus according to the present invention was used to evaluate damage to a specimen caused by a laser.

FIG. 3 shows some typical evaluation results. In performing the evaluations, the intensity of laser light was incrementally increased, and a separate but otherwise identical specimen was evaluated at each intensity at each of several durations of irradiation time (number of laser pulses incident on the specimen). In these tests, by way of example only and not intended to be limiting, the specimens were constructed were multiple layers of fluoride formed as an anti-reflective thin-film coating on a substrate. Thus, the goal of the tests was to determine the resistance of the fluoride thin films to exposure to laser light. In FIG. 3, the vertical axis is energy density and the horizontal axis is the number of laser pulses incident on the specimen. The filled circles indicate observable damage to the specimen, and open circles indicate no observable damage. As shown in FIG. 3, a region containing only filled circles can be separated by a straight line from a region containing only open circles, wherein the line represents a laser-damage threshold value for the specimen. The slope of the line can be used to estimate the longevity of the specimen in the presence of the laser light.

Damage to a thin film caused by laser light can arise from the presence of impurities in the thin film. I.e., the greater the concentration of impurities in the film, the more susceptible the thin film is to laser damage. Consequently, when performing tests as described above to evaluate the durability of a thin film structure to laser light, it is important when making the specimens that the level of impurities be as uniform as possible from specimen to specimen.

Figure 4:
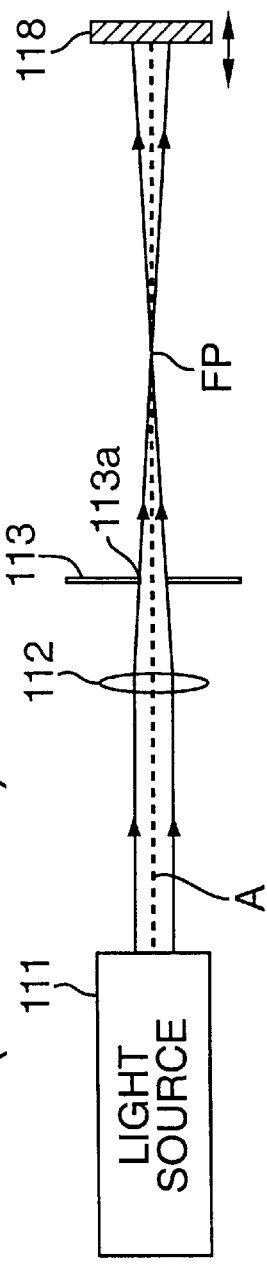
FIG. 4 is an optical diagram of a first prior-art optical system operable to produce a variable light intensity.
Figure 5:
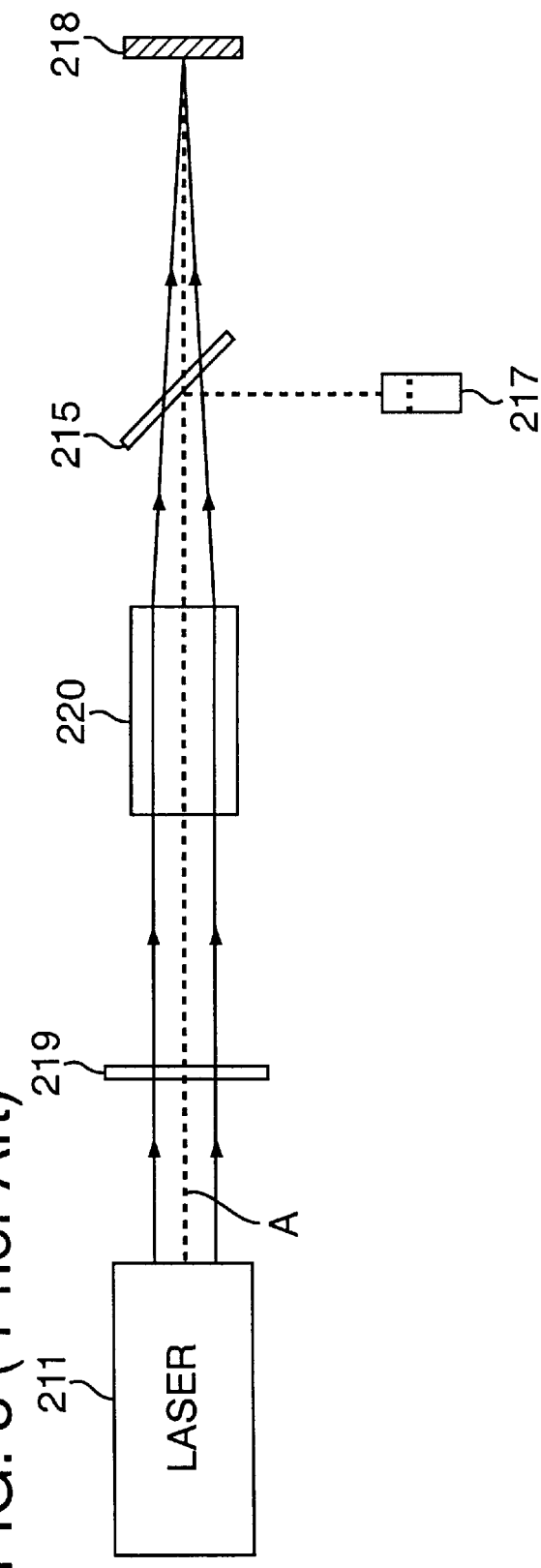
FIG. 5 is an optical diagram of a second prior-art optical system operable to produce a variable light intensity.

Because apparatus according to the present invention readily allow the intensity of laser light irradiated per unit surface area of specimen to be changed while keeping the irradiation surface area constant, highly accurate laser-damage profiles can be obtained for various types of specimens, compared to prior-art apparatus in which the size of the irradiation field necessarily changes whenever the intensity of the irradiation is changed (FIG. 4).

It will be readily appreciated from the foregoing that apparatus according to this invention are not limited to excimer lasers. Such apparatus also can utilize other high-output lasers such as $CO_2$ lasers and YAG lasers.

In addition, the present invention generally allows changes in light intensity per unit surface area to be readily and inexpensively made using a simple apparatus.

Whereas the invention has been described in connection with preferred embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. An apparatus for providing a variable-intensity irradiation laser light flux, the apparatus comprising on an optical axis:

(a) a laser light source operable to generate an irradiation laser light flux of substantially parallel rays propagating along the optical axis;

(b) a stop defining an aperture, the aperture being situated within the irradiation laser light flux of substantially parallel rays to define a transverse area illuminated by the irradiation laser light flux downstream of the stop, the stop being operable to change the size of the aperture; and (c) an intensity-adjusting optical subsystem situated between the laser light source and the stop, the intensity-adjusting optical subsystem being operable to change the beam diameter of the irradiation laser light flux incident on the stop, while maintaining parallelism of the rays passing through the aperture, and thus change the intensity of the irradiation laser light flux passing through the aperture.

2. The apparatus of claim 1, further comprising on the optical axis a condensing optical subsystem operable to converge the irradiation laser light flux after the irradiation laser light flux has passed through the aperture.

3. The apparatus of claim 1, wherein the aperture is round.

4. The apparatus of claim 1, wherein the irradiation laser light source is an excimer laser.

5. The apparatus of claim 4, wherein the laser is a KrF or ArF excimer laser.

6. The apparatus of claim 1, wherein the intensity-adjusting optical subsystem comprises first, second, and third lens groups, wherein the beam diameter of the irradiation laser light flux is changed by displacing at least one of the lens groups along the optical axis relative to another of the lens groups.

7. The apparatus of claim 6, wherein the first lens group comprises a positive lens element, the second lens group comprises two negative lens elements, and the third lens group comprises a positive lens group, the beam diameter of the irradiation laser light flux being made smaller by collectively moving the first and second lens groups closer to the third lens group.

8. An apparatus for changing an intensity of an irradiation laser light flux propagating from a laser light source as substantially parallel rays and with an upstream beam diameter on an optical axis, the apparatus comprising on the optical axis:

(a) an intensity-adjusting optical subsystem adapted to be axially situated downstream of the laser light source, the intensity-adjusting optical subsystem being operable to create a downstream irradiation laser light flux of substantially parallel rays propagating from the intensity-adjusting optical subsystem and having a beam diameter that is different from the upstream irradiation laser light flux, the intensity-adjusting optical subsystem comprising first, second, and third lens groups, wherein the beam diameter of the irradiation laser light flux is changed by moving at least one of the lens groups along the optical axis relative to another of the lens groups; and (b) a stop defining an aperture situated downstream of the intensity-adjusting optical subsystem, the aperture being situated within the beam diameter of the downstream irradiation laser light flux of substantially parallel rays so as to define the beam diameter of the irradiation laser light flux downstream of the stop.

9. The apparatus of claim 8, wherein the first lens group comprises a positive lens element, the second lens group comprises two negative lens elements, and the third lens group comprises a positive lens group, the beam diameter of the irradiation laser light flux being made smaller by collectively moving the first and second lens groups closer to the third lens group.

10. An apparatus for testing effects of light exposure on a specimen, the apparatus comprising:

(a) a laser light source operable to generate an irradiation laser light flux of substantially parallel rays propagating along an optical axis;

(b) a stop defining an aperture coaxial with the optical axis, the aperture being situated within the irradiation laser light flux to define a transverse area illuminated by the irradiation laser light flux downstream of the stop;

(c) an intensity-adjusting optical subsystem situated coaxially with the optical axis between the laser light source and the stop, the intensity-adjusting optical subsystem being operable to change the beam diameter of the irradiation laser light flux incident on the stop, while maintaining parallelism of the rays, and thus change the intensity of the irradiation laser light flux passing through the aperture;

(d) a condensing optical subsystem situated downstream of the aperture coaxially with the optical axis, the condensing optical subsystem being operable to converge the irradiation laser light flux passing through the aperture onto a specimen placed downstream of the condensing optical subsystem; and (e) a beam splitter situated downstream of the aperture to deflect a portion of the irradiation laser light flux downstream of the aperture.

11. The apparatus of claim 10, further comprising a power monitor situated relative to the beam splitter to measure the intensity of the deflected portion of the irradiation laser light flux.

12. The apparatus of claim 11, further comprising a beam-shaping optical subsystem situated on the optical axis between the laser light source and the intensity-adjusting optical subsystem, the beam-shaping optical subsystem being operable to shape the transverse profile of the irradiation laser light flux exiting the light source.

13. The apparatus of claim 10, wherein the intensity-adjusting optical subsystem comprises first, second, and third lens groups, wherein the beam diameter of the irradiation laser light flux is changed by moving at least one of the lens groups along the optical axis relative to another of the lens groups.

14. The apparatus of claim 13, wherein the first lens group comprises a positive lens element, the second lens group comprises two negative lens elements, and the third lens group comprises a positive lens group, the beam diameter of the irradiation laser light flux being made smaller by collectively moving the first and second lens groups closer to the third lens group.

15. The apparatus of claim 10, wherein the laser light source is an excimer laser.

16. A method for changing the intensity of an irradiation laser light flux produced by a laser light source, the method comprising:

(a) refracting an upstream irradiation laser light flux of substantially parallel rays, propagating along an optical axis and having an upstream beam diameter, to produce a downstream irradiation laser light flux of substantially parallel rays having a downstream beam diameter that is different from the upstream beam diameter, the upstream irradiation laser light flux being refracted by transmission through first, second, third, and fourth lens elements coaxially disposed relative to the optical axis, the first and fourth lens elements having positive refractive power, and the second and third lens elements having negative refractive power and being situated between the first and fourth lens elements; and (b) passing the downstream irradiation laser light flux of substantially parallel rays through an aperture, defined by a stop and situated coaxial with the optical axis, the aperture being smaller than the beam diameter of the downstream irradiation laser light flux.

17. A method for evaluating the resistance of a specimen to exposure to laser light, the method comprising the steps:

(a) refracting an upstream irradiation laser light flux of substantially parallel rays, propagating along an optical axis and having an upstream beam diameter, to produce a downstream irradiation laser light flux of substantially parallel rays having a downstream beam diameter that is different from the upstream beam diameter, the upstream irradiation laser light flux being refracted by transmission through first, second, third, and fourth lens elements coaxially disposed relative to the optical axis, the first and fourth lens elements having positive refractive power, and the second and third lens elements having negative refractive power and being situated between the first and fourth lens elements;

(b) passing the downstream irradiation laser light flux of substantially parallel rays through an aperture, defined by a stop and situated coaxial with the optical axis, the aperture being smaller than the beam diameter of the downstream irradiation laser light flux; and (c) refracting the irradiation laser light flux, after passing through the aperture, to converge the rays onto a specimen.

18. The method of claim 17, including the step of changing an intensity of the upsteam irradiation laser light flux.

19. The method of claim 18, wherein the step of changing the intensity of the upstream irradiation laser light flux comprises axially moving the first, second, and third lens elements relative to the fourth lens element.

20. A method for evaluating the resistance of a specimen to exposure to laser light, the method comprising the steps:

(a) refracting an upstream irradiation laser light flux of substantially parallel rays, propagating along an optical axis and having an upstream beam diameter, to produce a downstream irradiation laser light flux of substantially parallel rays having a downstream beam diameter that is different from the upstream beam diameter, the upstream irradiation laser light flux being refracted by transmission through first, second, third, and fourth lens elements coaxially disposed relative to the optical axis, the first and fourth lens elements having positive refractive power, and the second and third lens elements having negative refractive power and being situated between the first and fourth lens elements;

(b) passing the downstream irradiation laser light flux through an aperture, defined by a stop and situated coaxial with the optical axis, the aperture being smaller than the beam diameter of the downstream irradiation laser light flux;

(c) refracting the irradiation laser light flux, after passing through the aperture, to converge the rays onto a specimen; and measuring the intensity of the irradiation laser light flux incident on the specimen.

* * * * *

UNITED STATES PATENT AND TRADEMARK OFFICE
CERTIFICATE OF CORRECTION

PATENT NO. : 5,991,016

DATED : November 23, 1999

INVENTOR(S) : Noriyuki Irie

It is certified that error appears in the above-identified patent and that said Letters Patent is hereby corrected as shown below:

Column 3, line 66, "di" should be --d1--.

Signed and Sealed this

Twenty-second Day of May, 2001

*Attest:*

NICHOLAS P. GODICI

*Attesting Officer*     *Acting Director of the United States Patent and Trademark Office*